United States Patent
Ryu et al.

[11] Patent Number: 6,063,469
[45] Date of Patent: May 16, 2000

[54] TRIPLE SUBSTRATE OPTICAL DISK AND MANUFACTURING METHOD THEREOF

[75] Inventors: Su-Sun Ryu; Chang-Yong Lee, both of Choongchungnam-do, Rep. of Korea

[73] Assignee: SKC Limited, Kyungki-do, Rep. of Korea

[21] Appl. No.: 09/176,921

[22] Filed: Oct. 22, 1998

[30] Foreign Application Priority Data

Oct. 28, 1997 [KR] Rep. of Korea ............ 97-55489
Oct. 28, 1997 [KR] Rep. of Korea ............ 97-55490

[51] Int. Cl.$^7$ .................................................. B32B 3/00
[52] U.S. Cl. .................. 428/64.1; 428/64.4; 428/64.7; 428/65.2; 428/412; 428/689; 428/913; 430/270.12; 430/495.1; 430/945; 369/275.1; 369/283; 369/288
[58] Field of Search ................ 428/64.1, 64.2, 428/64.4, 65.2, 457, 64.7, 412, 689, 913; 430/270.12, 495.1, 945; 369/275.1, 283, 288

[56] References Cited

U.S. PATENT DOCUMENTS

| | | | |
|---|---|---|---|
| 5,761,188 | 6/1998 | Rosen | 369/275.2 |
| 5,764,621 | 6/1998 | Choi | 369/286 |
| 5,817,389 | 10/1998 | Ono | 428/64.1 |
| 5,862,121 | 1/1999 | Suzuki | 369/275.1 |

*Primary Examiner*—Elizabeth Evans
*Attorney, Agent, or Firm*—Friedman Siegelbaum LLP

[57] ABSTRACT

A triple substrate optical disk comprises a center substrate layer, a top substrate layer, a bottom substrate layer, a top adhesion layer bonding the top substrate layer to the center substrate layer and a bottom adhesion layer bonding the center substrate layer to the bottom substrate layer. The center substrate layer has a center substrate containing a top surface and a bottom surface thereof, a first recording layer deposited on the top surface of the center substrate and a second recording layer deposited on the bottom surface of the center substrate. The top substrate layer includes a top substrate and a third recording layer, wherein the top substrate has a top surface and a bottom surface thereof and the third recording layer is deposited on the bottom surface of the top substrate. The bottom substrate layer includes a bottom substrate and a fourth recording layer, wherein the bottom substrate has a top surface and a bottom surface thereof and the fourth recording layer is deposited on the top surface of the bottom substrate. Each of the top and bottom surfaces of the center substrate, the bottom surface of the top substrate and the top surface of the bottom substrate has tracks thereon arranged either spirally or concentrically, each of the tracks containing recesses and protrusions.

20 Claims, 8 Drawing Sheets even bottom surface of the center substrate, an intermediate transparent layer deposited on the first recording layer, a second recording layer deposited on the intermediate transparent layer, wherein the intermediate transparent layer is made of UV hardened photoresist and the second recording layer is made of reflective material.

TRIPLE SUBSTRATE OPTICAL DISK AND MANUFACTURING METHOD THEREOF

FIELD OF THE INVENTION

The present invention relates to an optical disk and a manufacturing method thereof; and, more particularly, to a triple substrate optical disk and a manufacturing method thereof.

DESCRIPTION OF THE PRIOR ART

In recent years, an optical disk has been widely used in data recording/playback system due to its high information recording density, high quality data playback capability and low manufacturing cost thereof.

Specifically, the so-called double substrate optical disk has been suggested to further increase its information data recording/playback capacity. FIG. 1 shows a schematic cross sectional view of a conventional double substrate optical disk 10. As shown in FIG. 1, the double substrate optical disk 10 comprises a top substrate layer 2, a bottom substrate layer 12 and an adhesion layer 9.

The top substrate layer 2 includes a top substrate 3, a first top recording layer 4, a top intermediate transparent layer 5 and a second top recording layer 7. And the bottom substrate layer 12 includes a bottom substrate 13, a first bottom recording layer 14, a bottom intermediate transparent layer 15 and a second bottom recording layer 17, wherein the top surface of the top substrate 3 and the bottom surface of the bottom substrate 13 are flat, respectively. In FIG. 1, arrows represent incident light beams, respectively.

The bottom substrate 13 is made of transparent rigid material, e.g., polymethyl methacrylate (PMMA) or polycarbonate (PC). The first bottom recording layer 14 is made of semitransparent rigid material, e.g., gold (Au). The bottom intermediate transparent layer 15 is made of transparent intermediate material, e.g., ultra-violet (UV) hardened photoresist. And the second bottom recording layer 17 is made of reflective rigid material, e.g., aluminum (Al).

Referring back to FIG. 1, in retrieving recorded data on the first bottom recording layer 14, a light beam, e.g., a He-Ne laser beam, passing through the bottom substrate 13 from a corresponding optical pick-up is impinged thereon and then reflected therefrom; and in retrieving recorded data on the second bottom recording layer 17, a light beam passing through the bottom substrate 13, the first bottom recording layer 14 and the bottom intermediate transparent layer 15 is impinged thereon and then reflected therefrom. It should be noted that the reflected light beam is picked up by a photodiode of the corresponding optical pick-up fitted in the light beam path.

It should be also noted that each top surface of the bottom substrate 13 and the bottom intermediate transparent layer 15 has a plurality of tracks being arranged either spirally or concentrically, wherein each of the tracks contains predetermined grooved patterns, i.e., recesses and protrusions for the recordation of the information data thereon.

The structure and dimension of the top substrate layer 2 is same as that of the bottom substrate layer 12, but symmetrically arranged with respect to the central line of the adhesion layer 9. Namely, the top substrate 3, the first top recording layer 4, the top intermediate transparent layer 5 and the second top recording layer 7 are same as the bottom substrate 13, the first bottom recording layer 14, the bottom intermediate transparent layer 15 and the second bottom recording layer 17, respectively.

Meanwhile, referring to FIGS. 2A to 2E, there are illustrated cross sectional views for use in describing a manufacturing process of the optical disk 10. First, referring to FIG. 2A, the first bottom recording layer 14 is made by depositing semitransparent material, e.g., gold (Au) on the top surface of the bottom substrate 13 by employing a known deposition method, e.g., a sputtering method or a vacuum vapor deposition technique. It should be noted that the bottom substrate 13 made of, e.g., PC is prepared by using a known substrate forming technique, e.g., an injection molding technique followed by a conventional stamper fabrication process.

And, as shown in FIG. 2B, a photoresist layer 150 is formed on the top surface of the first bottom recording layer 14 by using a conventional forming method, e.g., a spin coating method.

Thereafter, as depicted in FIG. 2C, the photoresist layer 150 is deformed in a predetermined configuration by using a stamper 16 made of Ni, preferably the same stamper used in preparing the bottom substrate 13 to thereby form a deformed photoresist layer 151, e.g., having the identical shape to that of the bottom intermediate transparent layer 15. And in order to harden the deformed photoresist layer 151, an ultra-violet (UV) beam is irradiated from outside through the bottom substrate 13 and the first bottom recording layer 14 on the deformed photoresist layer 151 to thereby produce a UV-hardened photoresist layer as the bottom intermediate transparent layer 15 as presented in FIG. 2D.

And then, the stamper 16 is separated from the bottom intermediate transparent layer 15. And the second bottom recording layer 17 is made by depositing reflective material, e.g., Al on the top surface of the bottom intermediate transparent layer 15 by employing, e.g., a sputtering method. As a result, the bottom substrate layer 12 is formed as shown in FIG. 2E.

The top substrate layer 2 is also formed by using the same fabrication process as that of the bottom substrate layer 12. Hence, for simplicity, detailed description for the fabrication process of the top substrate layer 2 is omitted.

Finally, the top substrate layer 2 and the bottom substrate layer 12 are bonded together by the adhesion layer 9 to thereby produce the double substrate optical disk 10 as shown in FIG. 1. The adhesion layer 9 is usually the so-called UV curing resin, e.g., lacquer material.

The above-described conventional substrate layer fabrication process as illustrated in FIGS. 2A to 2E, however, includes an intermediate transparent layer forming process having the steps of photoresist layer depositing, photoresist layer deforming and UV hardening of the deformed photoresist layer. This complicated process, therefore, makes it difficult to obtain the desired reproducibility, reliability and yield.

SUMMARY OF THE INVENTION

It is, therefore, an object of the present invention to provide a triple substrate optical disk having simple structure.

It is another object of the present invention to provide a manufacturing method of the triple substrate optical disk, which is capable of providing an improved reproducibility, reliability and yield.

In accordance with the present invention, there is provided an optical disk comprising a center substrate layer including a center substrate having a top surface and a bottom surface thereof, a first recording layer deposited on the top surface of the center substrate and a second recording layer deposited on the bottom surface of the center substrate; a top substrate layer including a top substrate and a third recording layer, wherein the top substrate has a top surface and a bottom surface thereof and the third recording layer is deposited on the bottom surface of the top substrate; a bottom substrate layer including a bottom substrate and a fourth recording layer, wherein the bottom substrate has a top surface and a bottom surface thereof and the fourth recording layer is deposited on the top surface of the bottom substrate; a top adhesion layer to bond the top substrate layer to the center substrate layer; and a bottom adhesion layer to bond the center substrate layer to the bottom substrate layer, wherein each of the top and bottom surfaces of the center substrate, the bottom surface of the top substrate and the top surface of the bottom substrate has tracks thereon arranged either spirally or concentrically, each of the tracks containing recesses and protrusions.

And in accordance with the present invention there is also provided a method for manufacturing a triple substrate optical disk, comprising the steps of: (a) depositing a first recording layer and a second recording layer on the top surface and the bottom surface of a center substrate, respectively, thereby producing a center substrate layer; (b) depositing a third recording layer on the bottom surface of a top substrate to thereby generate a top substrate layer; (c) depositing a fourth recording layer on the top surface of a bottom substrate to thereby provide a bottom substrate layer; (d) bonding the top substrate layer with the center substrate layer by using a top adhesion layer; and (e) bonding the center substrate layer with the bottom substrate layer by suing a bottom adhesion layer to thereby provide the triple substrate optical disk, wherein each of the top and bottom surfaces of the center substrate, the bottom surface of the top substrate and the top surface of the bottom substrate has tracks thereon arranged either spirally or concentrically, each of the tracks containing recesses and protrusions.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1:
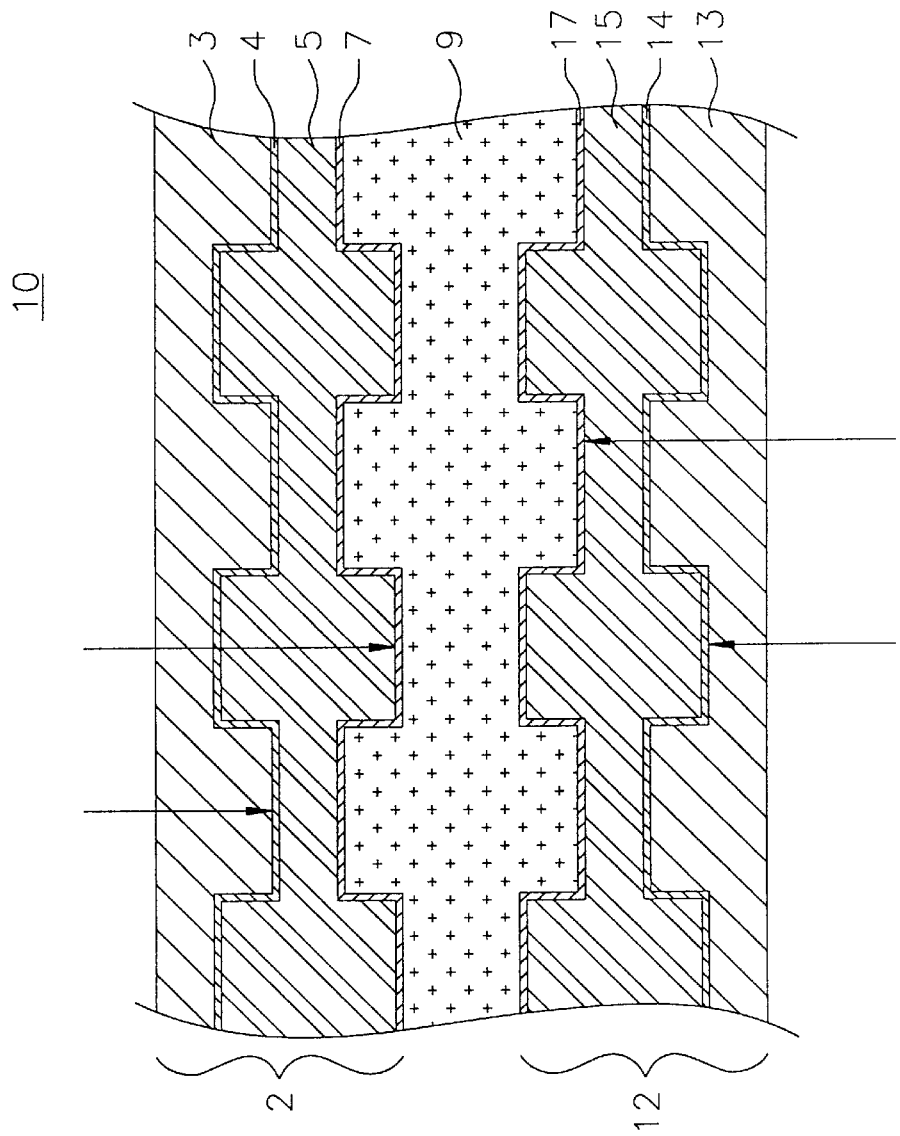
FIG. 1 shows a schematic cross sectional view of a conventional double substrate optical disk.
Figure 2A:
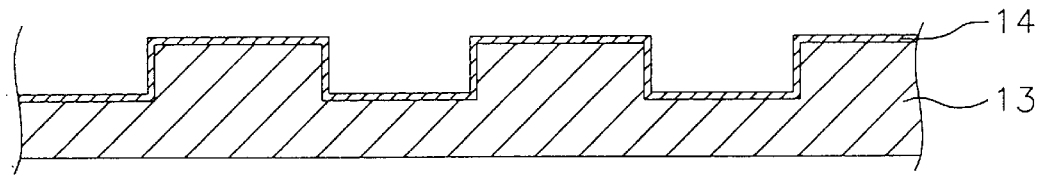
FIGS. 2A to 2E illustrate cross sectional views for use in describing a manufacturing process of the conventional double substrate optical disk.
Figure 2B:
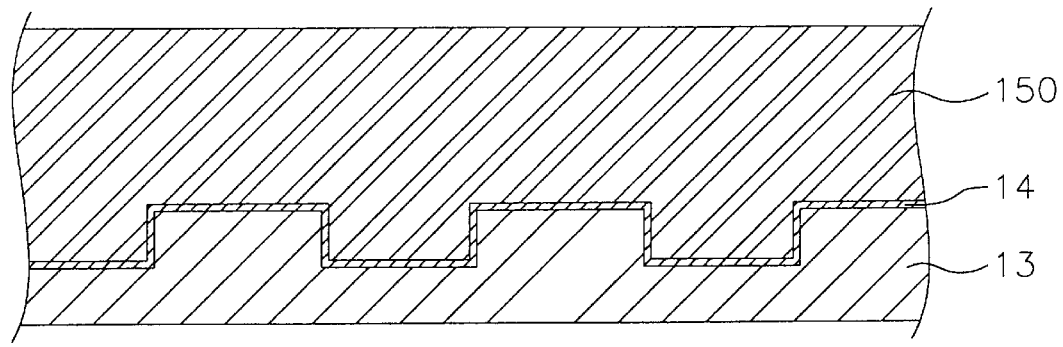
Figure 2C:
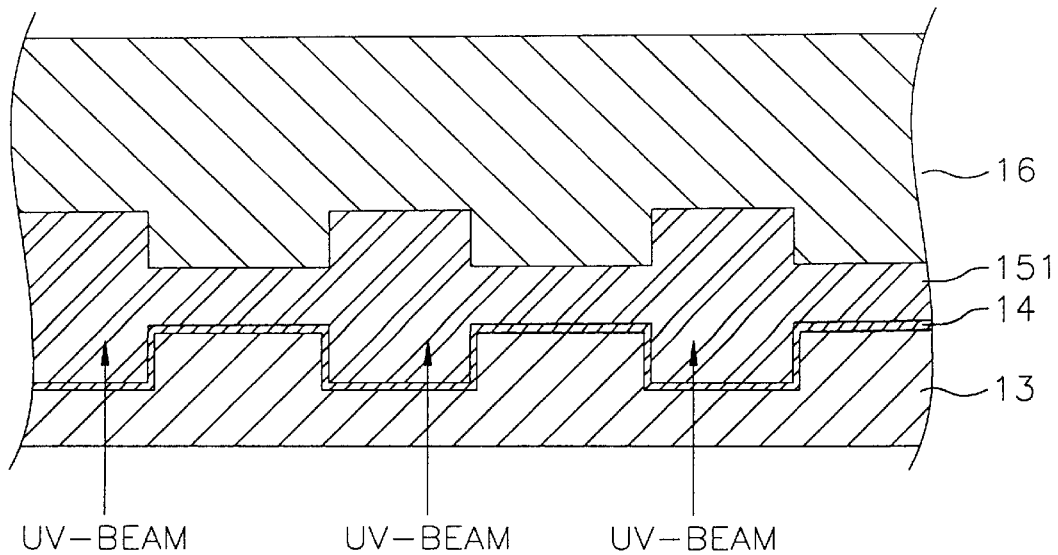
Figure 2D:
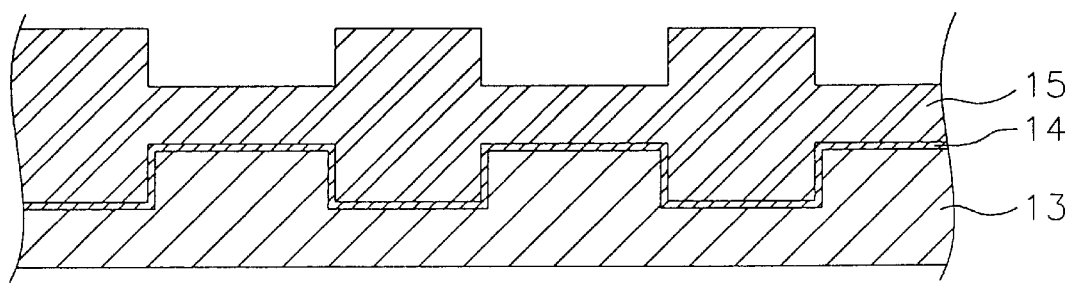
Figure 2E:
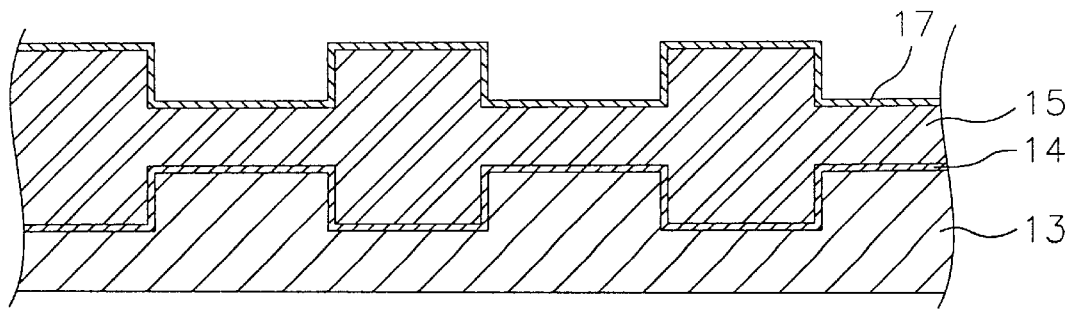
Figure 3:
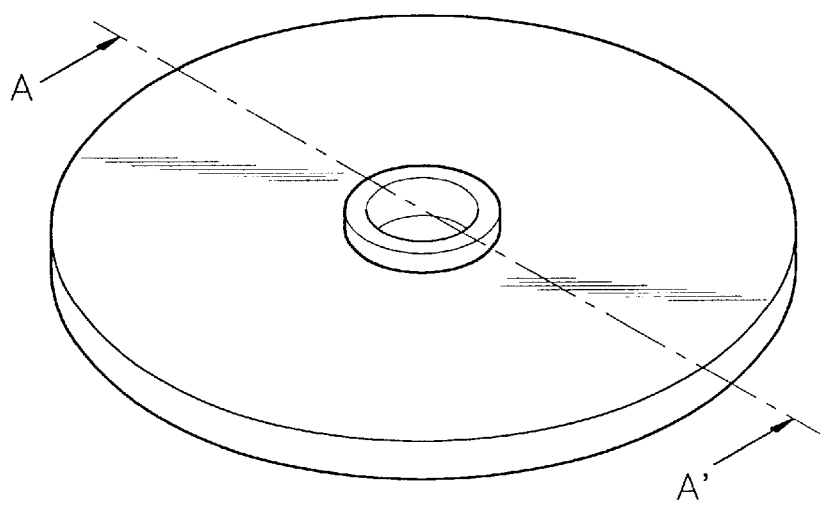
FIG. 3 presents a schematic view of a triple substrate optical disk in accordance with a preferred embodiment of the present invention.

Referring to FIG. 3, there is presented a schematic view of a triple substrate optical disk 20 in accordance with a preferred embodiment of the present invention. And referring to FIG. 4, there is depicted a schematic cross sectional view of the triple substrate optical disk 20 taken along A–A' in FIG. 3 in accordance with the preferred embodiment of the present invention.

Figure 4:
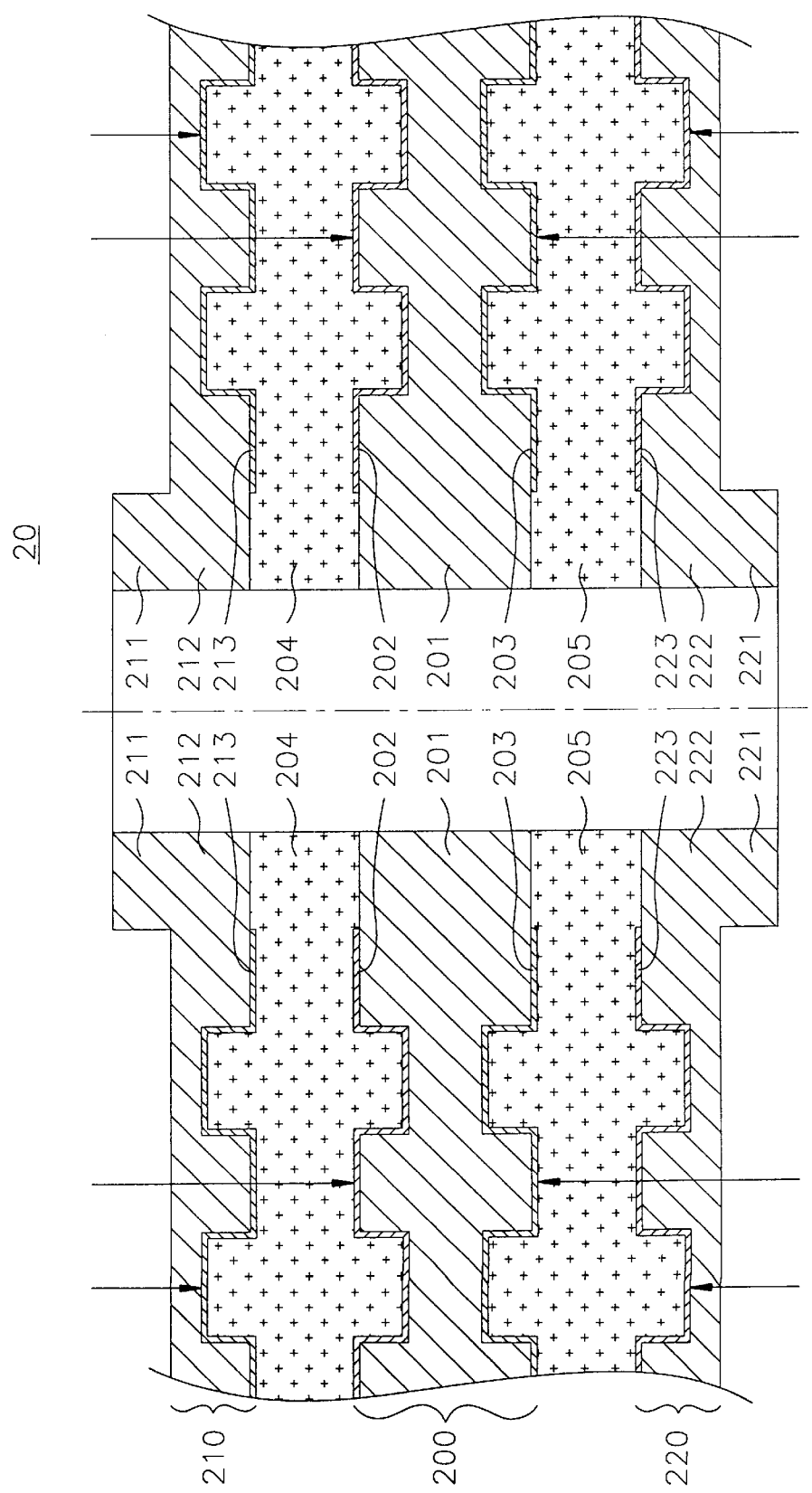
FIG. 4 depicts a schematic cross sectional view of the triple substrate optical disk in accordance with the preferred embodiment of the present invention.

From now on, referring to FIG. 4, the structure of the triple substrate optical disk 20 will be described. In FIG. 4, arrows represent respective incident light beams.

The triple substrate optical disk 20 comprises a center substrate layer 200, a top substrate layer 210, a bottom substrate layer 220, a top adhesion layer 204 and a bottom adhesion layer 205. Each of the center substrate 200, the top substrate 210 and the bottom substrate 220 is made of either polycarbonate (PC) or polymethyl methacrylate (PMMA).

It should be noted that each thickness of the center substrate layer 200, the top substrate layer 210 and the bottom substrate layer 220 ranges from about 0.3 mm to about 0.6 mm.

The center substrate layer 200 includes a center substrate 201 having a top surface and a bottom surface thereof; a first recording layer 202 deposited on the top surface of the center substrate 201; and a second recording layer 203 deposited on the bottom surface of the center substrate 201.

It should be noted that each of the first recording layer 202 and the second recording layer 203 is made of reflective rigid material, e.g., aluminum (Al) which reflects a light beam, e.g., a He-Ne laser beam irradiated thereon.

The top substrate layer 210 includes a top substrate 212 and a third recording layer 213, wherein the top substrate 210 has a top surface and a bottom surface thereof and the third recording layer 213 is deposited on the bottom surface of the top substrate 212.

The bottom substrate layer 220 includes a bottom substrate 222 and a fourth recording layer 223, wherein the bottom substrate 222 has a top surface and a bottom surface thereof and the fourth recording layer 223 is deposited on the top surface of the bottom substrate 222. Each of the third recording layer 213 and the fourth recording layer 223 is made of semitransparent rigid material, e.g., gold (Au).

It should be noted that in a thin and small optical disk, the allowable range of tilting angle of the optical disk for reproduction may be substantially small such that even a slight tilt can degrade the reproduced signal significantly. Further, since a triple substrate optical disk of the present invention is usually thinner than a conventional optical disk, even in the above case, it is necessary that corresponding related conventional facilities, e.g., a disk driver, an optical pick up and the like (not shown), also can be used without changing the dimension or the structure thereof.

To meet the above mentioned requirements, in the present invention, the top substrate 212 and the bottom substrate 222 have protrusion portions 211 and 221, respectively.

The protrusion portions 211 and 221 are located at a center-top end position of the top substrate 212 and a center-bottom end position of the bottom substrate 222, respectively as depicted in FIG. 4. And in accordance with a preferred embodiment of the present invention, each of the top surface of the protrusion portion 211 of the top substrate 212 and the bottom surface of the protrusion portion 221 of the bottom substrate 222 is flat.

It should be noted that the protrusion portions 211 and 221 belong to the so-called clamp zone located around the respective center portions of the triple substrate optical disk 20. The protrusion portions 211 and 221 are used to firmly fix the triple substrate optical disk 20 to a damper (not shown), thereby preventing the triple substrate optical disk 20 from tilting.

The top adhesion layer 204 intermediates between the top substrate layer 210 and the center substrate layer 200 to bond the top substrate layer 210 to the center substrate layer 200. And the bottom adhesion layer 205 intermediates between the bottom substrate layer 220 and the center substrate layer 200 to bond the bottom substrate layer 220 to the center substrate layer 200. Each of the top adhesion layer 204 and the bottom adhesion layer 205 is made of ultra-violet (UV) curing resin.

It should be noted that each of the top and bottom surfaces of the center substrate 201, the bottom surface of the top substrate 210 and the top surface of the bottom substrate 222 has tracks thereon arranged either spirally or concentrically, wherein each of the tracks contains recesses and protrusions.

Figure 5:
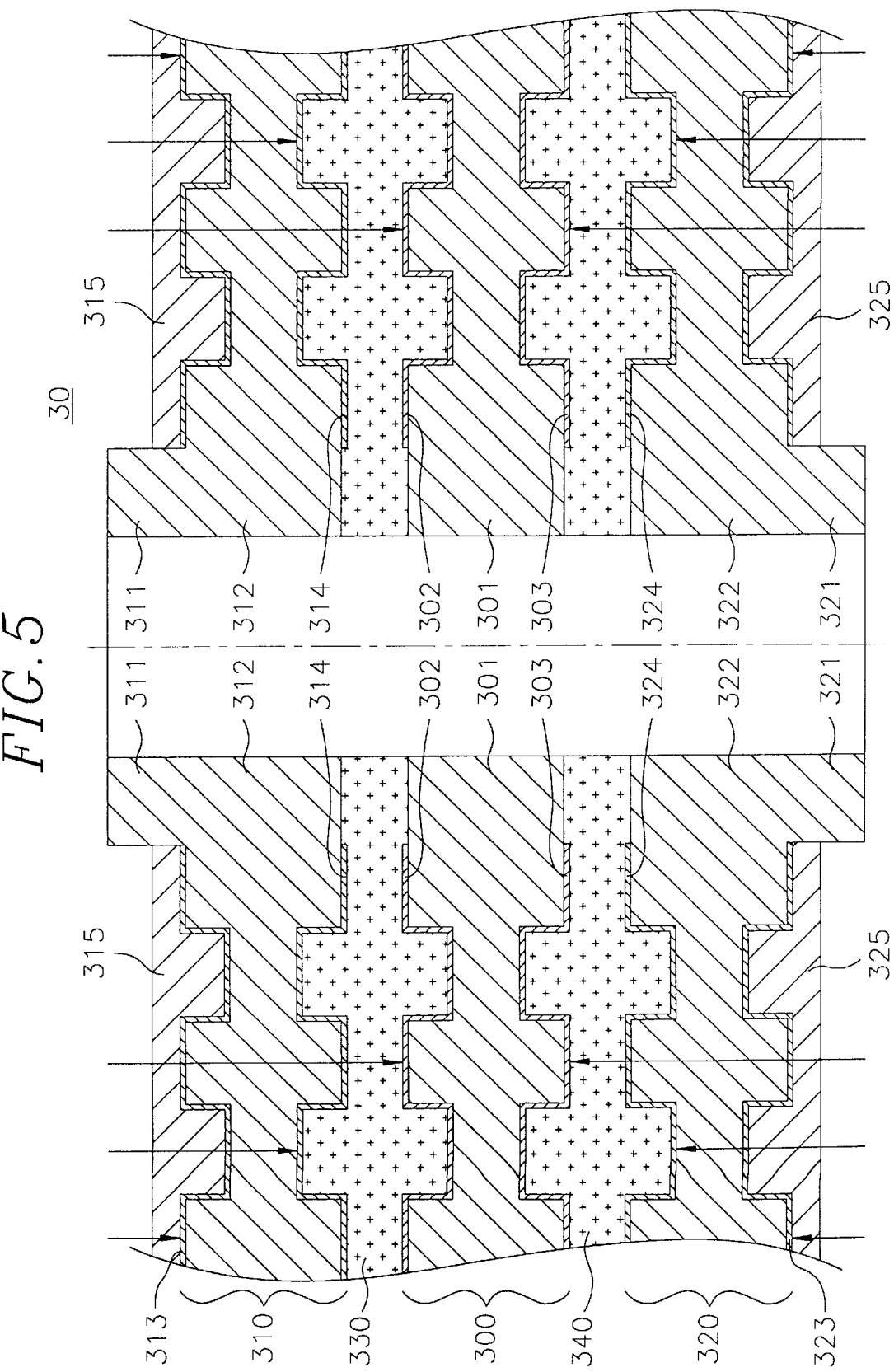
FIG. 5 represents a schematic cross sectional view of a triple substrate optical disk in accordance with another preferred embodiment of the present invention.

Meanwhile, referring to FIG. 5, there is represented a schematic cross sectional view of a triple substrate optical disk 30 in accordance with another preferred embodiment of the present invention. In FIG. 5, arrows represent respective incident light beams. From now on, referring to FIG. 5, the structure of the triple substrate optical disk 30 will be described.

The triple substrate optical disk 30 comprises a center substrate layer 300, a top substrate layer 310, a bottom substrate layer 320, a top adhesion layer 330, a bottom adhesion layer 340, a top protective layer 315 and a bottom protective layer 325. Each of the center substrate 300, the top substrate 310 and the bottom substrate 320 is made of either a polycarbonate (PC) or a polymethyl methacrylate (PMMA).

It should be noted that each thickness of the center substrate layer 300, the top substrate layer 310 and the bottom substrate layer 320 ranges from about 0.3 mm to about 0.6 mm.

The center substrate layer 300 includes a center substrate 301 having a top surface and a bottom surface thereof; a first recording layer 302 deposited on the top surface of the center substrate 301; and a second recording layer 303 deposited on the bottom surface of the center substrate 301.

The top substrate layer 310 includes a top substrate 312 having a top surface and a bottom surface thereof; a third recording layer 314 deposited on the bottom surface of the top substrate 312; and a fourth recording layer 313 deposited on the top surface of the top substrate 312.

The bottom substrate layer 320 includes a bottom substrate 322 having a top surface and a bottom surface thereof; a fifth recording layer 324 deposited on the top surface of the bottom substrate 322; and a sixth recording layer 323 deposited on the bottom surface of the bottom substrate 322.

Each of the first recording layer 302 and the second recording layer 303 is made of reflective rigid material, e.g. Al. And each of the recording layers 313, 314, 323 and 324 is made of semitransparent rigid material, e.g., gold (Au).

Each of the third recording layer 314 and the fifth recording layer 324 is made of first semitransparent rigid material having a first refractive index; and each of the fourth recording layer 313 and the sixth recording layer 323 is made of second semitransparent rigid material having a second refractive index which is different from the first refractive index.

The top substrate 312 and the bottom substrate 322 have protrusion portions 311 and 321, respectively. The protrusion portions 311 and 321 are located at a center-top end position of the top substrate 312 and a center-bottom end position of the bottom substrate 322, respectively as depicted in FIG. 5. And in accordance with a preferred embodiment of the present invention, each of the top surface of the protrusion portion 311 of the top substrate 312 and the bottom surface of the protrusion portion 321 of the bottom substrate 322 is flat.

The top adhesion layer 330 intermediates between the top substrate layer 310 and the center substrate layer 300 to bond the top substrate layer 310 to the center substrate layer 300. And the bottom adhesion layer 340 intermediates between the bottom substrate layer 320 and the center substrate layer 300 to bond the bottom substrate layer 320 to the center substrate layer 300. Each of the top adhesion layer 330 and the bottom adhesion layer 340 is made of ultra-violet (UV) curing resin, e.g., lacquer material.

The top protection layer 315 and the bottom protection layer 325 are deposited on the top surface of the fourth recording layer 313 and the bottom surface of the sixth recording layer 325, respectively. And each of the top protection layer 315 and the bottom protection layer 325 is made of material resistant to chemical attacks, e.g., plastic resin.

It should be noted that each of the top and bottom surfaces of the center substrate 300, the top substrate 312 and the bottom substrate 322 has tracks thereon arranged either spirally or concentrically, wherein each of the tracks contains recesses and protrusions.

Figure 6A:
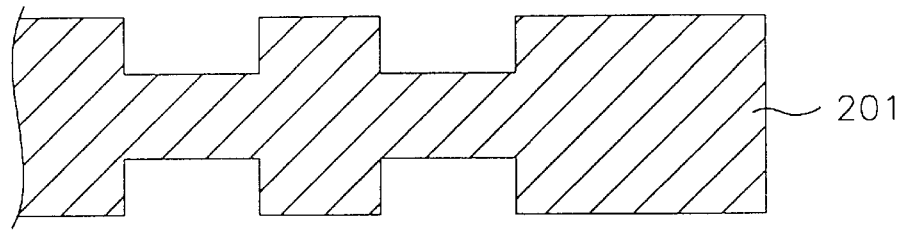
FIGS. 6A to 6F set forth cross sectional views for use in describing a manufacturing process of the triple substrate optical disk in accordance with the preferred embodiment of the present invention.

FIGS. 6A to 6F set forth cross sectional views for use in describing a manufacturing process of the triple substrate optical disk 20 in accordance with the preferred embodiment of the present invention. First, the process or method for manufacturing the triple substrate optical disk 20 may begin by preparing the center substrate 201 as shown in FIG. 6A.

And then, the first recording layer 202 and the second recording layer 203, e.g., made of Al are deposited on the top surface and the bottom surface of the center substrate 201, respectively, by using a sputtering method or a vacuum vapor deposition method.

Figure 6B:
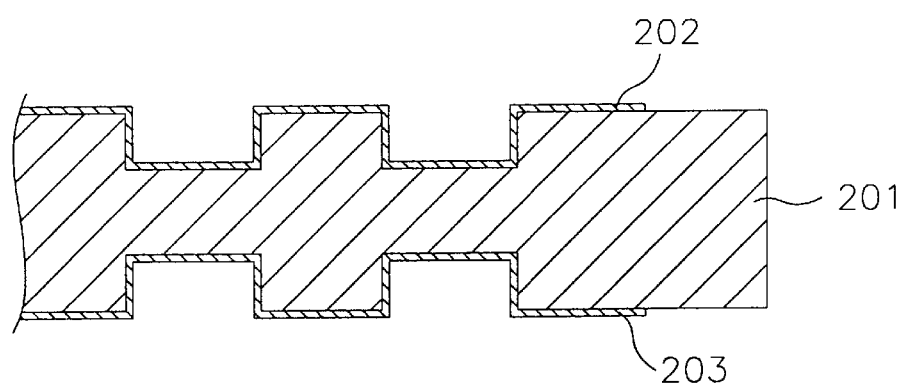
Figure 6C:
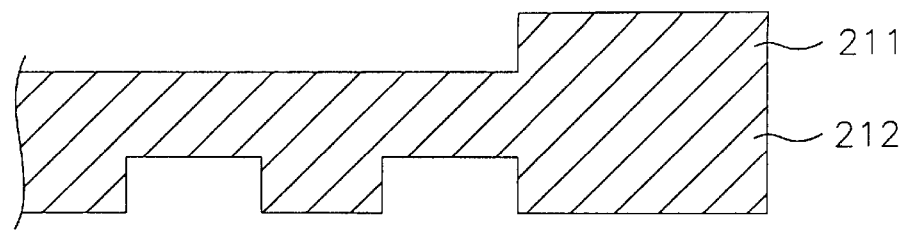
Figure 6D:
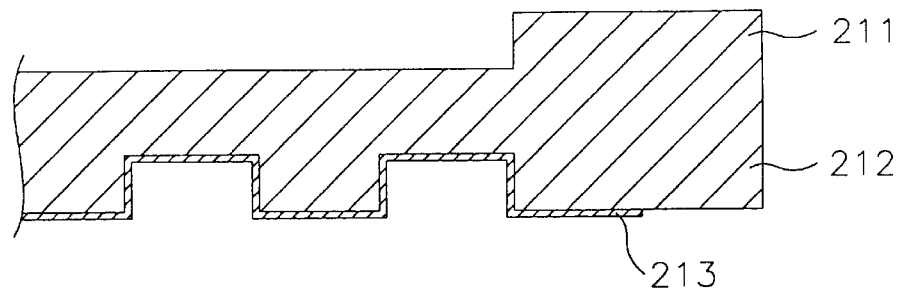
Figure 6E:
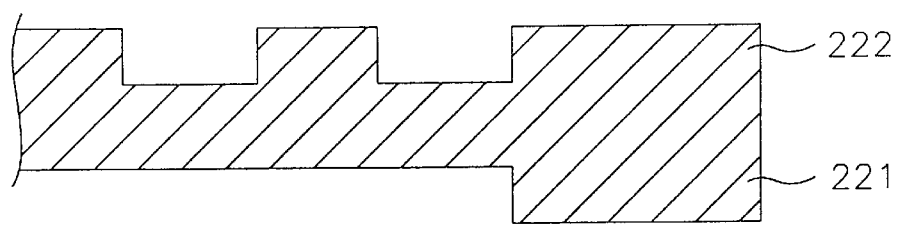

Thereafter, as illustrated in FIGS. 6C and 6D, the third recording layer 213 is deposited on the bottom surface of the top substrate 212 having the protrusion portion 211 by using a sputtering method. And as illustrated in FIGS. 6E and 6F, the fourth recording layer 223 is deposited on the top surface of the bottom substrate 222 having the protrusion portion 223 by using a sputtering method.

Figure 6F:
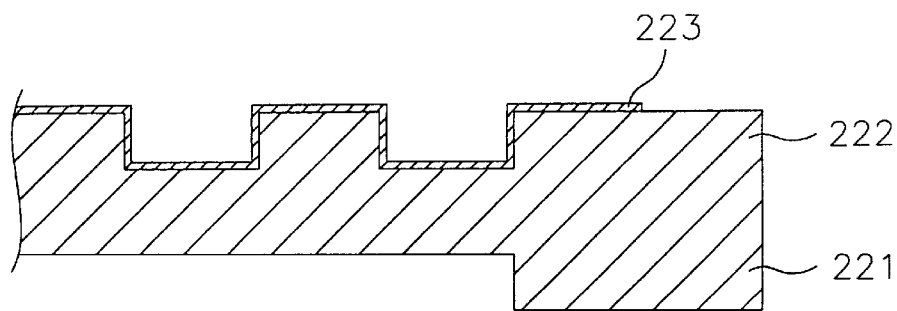

It should be noted that in accordance with a preferred embodiment of the present invention, as shown in FIG. 6B, the first recording layer 202 and the second recording layer 203 are not deposited on predetermined corresponding center end positions, i.e., the so-called clamp zones, in the top surface and the bottom surface of the center substrate 201, respectively; and as shown in FIGS. 6D and 6F, the third recording layer 213 and the fourth recording layer 223 are not deposited on predetermined corresponding center end positions in the bottom surface of the top substrate 212 and the top surface of the bottom substrate 222, respectively.

In a subsequent step, the center substrate layer 200 and the top substrate layer 210 are bonded to a top adhesion layer, e.g., made of UV-curing resin by using a UV hardening technique; and the center substrate layer 200 and the bottom substrate layer 220 are bonded to a bottom adhesion layer, e.g., made of UV-curing resin by using a UV hardening technique to thereby produce the triple substrate optical disk 20.

For simplicity, description for the manufacturing process of the triple substrate optical disk 30 is omitted since the manufacturing process of the triple substrate optical disk 30 is similar to that of the triple substrate optical disk 20 except that the manufacturing process of the triple substrate optical disk 30 further comprises steps of depositing the top protection layer 315 on the top surface of the fourth recording layer 313 and the bottom protection layer 325 on the bottom surface of the sixth recording layer 323, respectively.

As can be easily understood in the above description, in comparison with the prior art disk, the structure of the triple optical disk of the present invention is very simple. Especially, the triple substrate optical disk of the present invention does not comprise an intermediate transparent layer. And the method for manufacturing a triple optical disk of the present invention is far simpler than the conventional method since the intermediate transparent layer fabrication process is eliminated.

Therefore, in accordance with the present invention, the structure of the optical disk and the method thereof becomes simplified, thereby resulting in enhancement of the reproducibility as well as reduction of the manufacturing cost thereof.

While the present invention has been described with respect to certain preferred embodiments only, other modifications and variations may be made without departing from the scope and spirit of the present invention as set forth in the following claims.

What is claimed is:

1. An optical disk comprising:
   a center substrate layer including a center substrate having a top surface and a bottom surface thereof, a first recording layer deposited on the top surface of the center substrate and a second recording layer deposited on the bottom surface of the center substrate;
   a top substrate layer including a top substrate and a third recording layer, wherein the top substrate has a top surface and a bottom surface thereof and the third recording layer is deposited on the bottom surface of the top substrate;
   a bottom substrate layer including a bottom substrate and a fourth recording layer, wherein the bottom substrate has a top surface and a bottom surface thereof and the fourth recording layer is deposited on the top surface of the bottom substrate;
   a top adhesion layer to bond the top substrate layer to the center substrate layer; and
   a bottom adhesion layer to bond the center substrate layer to the bottom substrate layer, wherein each of the top and bottom surfaces of the center substrate, the bottom surface of the top substrate and the top surface of the bottom substrate has tracks thereon arranged either spirally or concentrically, each of the tracks containing recesses and protrusions.

2. The optical disk of claim 1, wherein the top substrate and the bottom substrate have protrusion portions located at a center-top end position of the top substrate and a center-bottom end position of the bottom substrate, respectively, each of the top surface of the protrusion portion of the top substrate and the bottom surface of the protrusion portion of the bottom substrate being flat.

3. The optical disk of claim 2, wherein each of the first recording layer and the second recording layer is made of reflective rigid material which reflects a light beam irradiated thereon.

4. The optical disk of claim 3, wherein each of the third recording layer and the fourth recording layer is made of semitransparent rigid material.

5. The optical disk of claim 4, wherein each of the center substrate, the top substrate and the bottom substrate is made of either polycarbonate (PC) or polymethyl methacrylate (PMMA).

6. The optical disk of claim 5, wherein each of the top adhesion layer and the bottom adhesion layer is made of ultra-violet (UV) curing resin.

7. The optical disk of claim 6, wherein each of the first recording layer and the second recording layer is made of aluminum (Al).

8. The optical disk of claim 7, wherein each of the third recording layer and the fourth recording layer is made of gold (Au).

9. The optical disk of claim 8, wherein the thickness of said each of the center substrate, the top substrate and the bottom substrate ranges from about 0.3 mm to about 0.6 mm.

10. An optical disk comprising:
    a center substrate layer including a center substrate having a top surface and a bottom surface thereof, a first recording layer deposited on the top surface of the center substrate and a second recording layer deposited on the bottom surface of the center substrate;
    a top substrate layer including a top substrate having a top surface and a bottom surface thereof, a third recording layer deposited on the bottom surface of the top substrate and a fourth recording layer deposited on the top surface of the top substrate;
    a bottom substrate layer including a bottom substrate having a top surface and a bottom surface thereof, a fifth recording layer deposited on the top surface of the bottom substrate and a sixth recording layer deposited on the bottom surface of the bottom substrate;
    a top adhesion layer to bond the top substrate layer to the center substrate layer; and
    a bottom adhesion layer to bond the center substrate layer to the bottom substrate layer, wherein each of the top and bottom surfaces of the center substrate, the top substrate and the bottom substrate has tracks thereon arranged either spirally or concentrically, each of the tracks containing recesses and protrusions.

11. The optical disk of claim 10, further comprising:
    a top protection layer deposited on the top surface of the fourth recording layer; and
    a bottom protection layer deposited on the bottom surface of the sixth recording layer.

12. The optical disk of claim 11, wherein the top substrate and the bottom substrate have protrusion portions located at a center-top end position of the top substrate and a center-bottom end position of the bottom substrate, respectively.

13. The optical disk of claim 12, wherein each of the first recording layer and the second recording layer is made of reflective rigid material which reflects a light beam irradiated thereon.

14. The optical disk of claim 13, wherein each of the third recording layer and the fifth recording layer is made of first semitransparent rigid material having a first refractive index; and each of the fourth recording layer and the sixth recording layer is made of second semitransparent rigid material having a second refractive index which is different from the first refractive index.

15. The optical disk of claim 14, wherein each of the center substrate, the top substrate and the bottom substrate is made of polycarbonate (PC); and the thickness of said each of the center substrate layer, the top substrate layer and the bottom substrate layer ranges from about 0.3 mm to about 0.6 mm.

16. A method for manufacturing a triple substrate optical disk, comprising the steps of:
   (a) depositing a first recording layer and a second recording layer on the top surface and the bottom surface of a center substrate, respectively, thereby producing a center substrate layer;
   (b) depositing a third recording layer on the bottom surface of a top substrate to thereby generate a top substrate layer;
   (c) depositing a fourth recording layer on the top surface of a bottom substrate to thereby provide a bottom substrate layer;
   (d) bonding the top substrate layer to the center substrate layer by using a top adhesion layer; and
   (e) bonding the center substrate layer to with the bottom substrate layer by using a bottom adhesion layer to thereby provide the triple substrate optical disk, wherein each of the top and bottom surfaces of the center substrate, the bottom surface of the top substrate and the top surface of the bottom substrate has tracks thereon arranged either spirally or concentrically, each of the tracks containing recesses and protrusions.

17. The method of claim 16, wherein the top surface of the top substrate and the bottom surface of the bottom substrate have protrusion portions located at a center-top end position of the top substrate and a center-bottom end position of the bottom substrate, respectively, each of the top surface of the protrusion portion of the top substrate and the bottom surface of the protrusion portion of the bottom substrate being flat.

18. The method of claim 17, wherein each of the first recording layer and the second recording layer is made of Al; and each of the third recording layer and the fourth recording layer is made of Au.

19. The method of claim 18, wherein each of said steps (a), (b) and (c) is carried out by using a sputtering method; each of the top adhesion layer and the bottom adhesion layer is made of ultra-violet (UV) curing resin; and each of the steps (d) and (e) is performed by using a UV hardening technique.

20. The method of claim 19, wherein the thickness of said each of the center substrate, the top substrate and the bottom substrate ranges from about 0.3 mm to about 0.6 mm.

* * * * *